(12) United States Patent
Hirose

(10) Patent No.: US 7,435,778 B2
(45) Date of Patent: Oct. 14, 2008

(54) ETHYLENE-ALKYL ACRYLATE COPOLYMER RUBBER COMPOSITION

(75) Inventor: Shiro Hirose, Fujisawa (JP)

(73) Assignee: Nok Corporation, Tokyo (JP)

( * ) Notice: Subject to any disclaimer, the term of this patent is extended or adjusted under 35 U.S.C. 154(b) by 194 days.

(21) Appl. No.: 10/594,783

(22) PCT Filed: Jun. 20, 2005

(86) PCT No.: PCT/JP2005/011247

§ 371 (c)(1),
(2), (4) Date: Sep. 29, 2006

(87) PCT Pub. No.: WO2006/006346

PCT Pub. Date: Jan. 19, 2006

(65) Prior Publication Data

US 2008/0058464 A1    Mar. 6, 2008

(30) Foreign Application Priority Data

Jul. 14, 2004    (JP) .............................. 2004-207319

(51) Int. Cl.
*C08L 37/00*    (2006.01)
(52) U.S. Cl. ...................... 524/517; 524/523; 525/194; 525/208; 525/222; 525/223
(58) Field of Classification Search ................ 524/517, 524/523; 525/194, 208, 222, 223
See application file for complete search history.

(56) References Cited

U.S. PATENT DOCUMENTS

| | | | | | |
|---|---|---|---|---|---|
| 4,303,560 | A | * | 12/1981 | Takahashi et al. | ........... 524/265 |
| 4,761,452 | A | * | 8/1988 | Itoh et al. | .................. 524/521 |
| 4,894,408 | A | * | 1/1990 | Hazelton et al. | ............ 524/425 |
| 4,933,389 | A | * | 6/1990 | Hikasa et al. | ............... 524/523 |

FOREIGN PATENT DOCUMENTS

| | | |
|---|---|---|
| JP | 61-171750 | 8/1986 |
| JP | 63-112627 | 5/1988 |
| JP | 11-166078 | 6/1999 |
| JP | 2000-143894 | 5/2000 |

\* cited by examiner

*Primary Examiner*—Bernard Lipman
(74) *Attorney, Agent, or Firm*—Butzel Long

(57) ABSTRACT

An ethylene-alkyl acrylate copolymer rubber composition, which comprises 100 parts by weight of ethylene-alkyl acrylate copolymer rubber having an amine vulcanizable group, 0-60 parts by weight of EPDM, 5-40 parts by weight of a plasticizer, 0.5-4 parts by weight of an organic peroxide cross-linking agent, 0.5-4 parts by weight of an amine-based cross-linking agent, and preferably 0.1-0.5 parts by weight of a sulfur compound. Oil extended EPDM can be used in place of EPDM or EPDM and the plasticizer. Use of 1-30 parts by weight of α-olefin oligomer together with 5-50 parts by weight of EPDM can improve the processability (non-adhesion of product itself to a mold or prevention of bleed occurrence).

15 Claims, No Drawings

ETHYLENE-ALKYL ACRYLATE COPOLYMER RUBBER COMPOSITION

RELATED APPLICATION

The present application is a 35 U.S.C. §371 national stage filing of International Patent Application No. PCT/JP2005/011247, filed Jun. 20, 2005, through which and to which priority is claimed to Japanese Priority Patent Application No. 2004-207319, filed Jul. 14, 2004.

TECHNICAL FIELD

The present invention relates to an ethylene-alkyl acrylate copolymer rubber composition, and more particularly to an ethylene-alkylate copolymer rubber composition for suitable use as molding materials for constant velocity joint (CVJ) boots, etc.

BACKGROUND ART

Mainly, chloroprene has been so far used as rubber materials for use in the conventional CVJ boots, and it is the current status that temperature elevation in the engine room and its surrounding regions due to recent requirements for higher outputs of automobile is making the conventional rubber material thermally unsatisfactory.

Recommended substitute materials includes ethylene-alkyl acrylate copolymer rubber (as will be hereinafter referred to as AEM) as one of heat-resistant polymers. A variety of hardness and low temperature durability are required, depending on product uses. For example, lower hardness and improvement of low temperature durability need such means as addition of a plasticizer, reduction in the amount of carbon black, etc.

However, in the case of AEM, the addition of a plasticizer may bring about air inclusion or lowering of physical properties due to lowering of cross-linking density at the time of peroxide cross-linking, and the reduction in the amount of carbon black is not only may lower physical properties such as rubber strength, etc., but also may give rise to air inclusion at the time of vulcanization molding. A countermeasure against the air inclusion includes an increase in the amount of organic peroxide, which may however result in elevation of hardness, lowering of elongation, and even air inclusion due to gases generated from the organic peroxide itself, so any of these means has been found practically unsatisfactory.

To solve these problems it has been so far proposed to blend AEM with a specific ethylene-propylene-diene terpolymer (as will be hereinafter referred to as EPDM) or oil extended EPDM, followed by peroxide cross-linking to lower the hardness, which is effective for combination with paraffinic plasticizers, but not for combination of oil non-extended EPDM with other plasticizers such as ester-based ones, etc. having a good compatibility with AEM, because of occurrence of such inconveniences as air inclusion, etc. That is, there is such a selectivity as limited plasticizers.

Patent Literature 1: JP-A-2000-143894.

Addition of EPDM has an effect on improvement of low temperature characteristics, but in the case of said Patent Literature 1, cross-linking is carried out only with an organic peroxide, but amine vulcanization may give rise to air inclusion, and thus even the vulcanization system has a limited selectivity.

DISCLOSURE OF THE INVENTION

Problem to be Solved by the Invention

An object of the present invention is to provide an AEM rubber composition for suitable use as molding materials for constant velocity joint boots, etc. with lower hardness and improved low temperature characteristics of vulcanization molding products made from the AEM rubber composition without occurrence of any inconveniences such as air inclusion, etc.

Means for Solving the Problem

The object of the present invention can be attained by an ethylene-alkyl acrylate copolymer rubber composition, which comprises 100 parts by weight of ethylene-alkyl acrylate copolymer rubber having an amine vulcanizable group, 0-60 parts by weight of EPDM, 5-40 parts by weight of a plasticizer, 0.5-4 parts by weight of an organic peroxide cross-linking agent, 0.5-4 parts by weight of an amine-based cross-linking agent, and preferably 0.1-0.5 parts by weight of a sulfur compound. In place of the EPDM or the EPDM and the plasticizer, oil extended EPDM can be used. Simultaneous use of 1-30 parts by weight of α-olefin oligomer together with 5-50 parts by weight of the EPDM can further improve the processability.

Effect of the Invention

Vulcanization molding products obtained from AEM having an amine vulcanizable group upon simultaneous use of a peroxide-based cross-linking agent and an amine-based vulcanizing agent can give no such adverse effect on processability as air inclusion, even if compounded with a large amount of a plasticizer, and thus lower hardness can be attained by compounding of a large amount of the plasticizer, and also improvement of low temperature characteristics can be also expected. Furthermore, compounding of EPDM can attain a distinguished effect such as expectable further improvement of low temperature characteristics. Simultaneous use of a sulfur compound as a vulcanization system can attain improvement of the durability. Simultaneous use of α-olefin oligomer together with EPDM can further improve the processability (non-adhesion of the product body to the mold or prevention of bleeding occurrence). The vulcanization molding products with such characteristics can be effectively used for constant velocity joint boots, dust covers, vibration-damping rubber, etc.

BEST MODES FOR CARRYING OUT THE INVENTION

Ternary type AEM having an amine vulcanizable group to be used herein includes ethylene-alkyl acrylate copolymer rubber further copolymerized with an epoxy group or hydroxyl group-containing monomer, etc. For example, commercially available products (some of Vamac series of DuPont products, etc.) can be used directly. Epoxy group-containing vinyl monomers to be used herein include, for example, glycidyl (meth)acrylate, alkyl glycidyl ether, glycidyl vinyl ether, alicyclic epoxy group-containing (meth) acrylate, etc. Hydroxyl group-containing vinyl monomers to be used herein include, for example, 2-hydroxyethyl (meth) acrylate, 2-hydroxypropyl (meth)acrylate, 3-hydroxypropyl (meth)acrylate, 4-hydroxybutyl (meth)acrylate, etc. These vinyl monomers can be used in the copolymerization reaction usually in a proportion of about 0.1 to about 10% by weight as cross-linking site-forming monomers. Binary type ethylene-alkyl acrylate copolymer rubber fails to undergo amine vulcanization and thus is not appropriate for the present invention. The term "(meth)acrylate" herein used means either acrylate or methacrylate.

Not more than 60 parts by weight, preferably 5-50 parts by weight, of EPDM can be used on the basis of 100 parts by weight of the ternary type AEM. The low temperature characteristics (low temperature impact brittleness test) can be improved by addition of the EPDM. When the amount of EPDM is less than 5 parts by weight, the processability can be largely improved in the presence of added plasticizer, but the effect on the improvement of low temperature characteristics is less remarkable. More than 5 parts by weight can show a more remarkable effect on the improvement of low temperature characteristics. Up to 60 parts by weight is applicable, but more than 60 parts by weight will lower the vulcanization rate, resulting in deterioration of productivity and thus is not preferable. In application to constant velocity joint boots to be exposed particularly to oily surrounding, a proportion of more than 50 parts by weight may lower the oil resistance of boots molded from the composition, so a proportion of 5-40 parts by weight is preferable. EPDM is not particularly limited by Money viscosity, etc. and oil extended EPDM can be also used.

Oil extended EPDM is an EPDM extended to about 50 to about 120% by weight, preferably about 70 to about 120% by weight by an oil extender on the basis of EPDM. Oil extender to be used herein includes, for example, petroleum-based hydrocarbon (paraffinic, naphthenic, aromatic, etc.) and their hydrogenated ones, various petroleum resins, etc. An adding proportion of oil extended EPDM depends on the amount of oil extender added to EPDM. For example, in the case of oil extended EPDM with 100% by weight of oil extender, a proportion is about 10 to about 60 parts by weight, preferably about 20 to about 50 parts by weight on the basis of 100 parts by weight of the copolymer rubber. A proportion of more than about 60 parts by weight may be likely to generate foams by air inclusion, etc.

Plasticizer to be used herein includes petroleum-based hydrocarbon such as paraffinic, naphthenic, aromatic ones, and their hydrogenated ones; vegetable oil such as coconut oil, etc.; ester-based ones, etc. Ester-based plasticizers can be preferably used. The plasticizer can be used in a proportion of 5-40 parts by weight, preferably 10-25 parts by weight, on the basis of 100 parts by weight of the ternary type AEM. The plasticizer in a proportion of more than 40 parts by weight is liable to generate foams by air inclusion, etc. In the case of using oil extended EPDM, the oil extender component can act also as a plasticizer.

For a vulcanization system, both peroxide-based cross-linking agent and amine-based vulcanizing agent can be used together. Specifically, 0.5-4 parts by weight, preferably 0.5-2 parts by weight, of an organic peroxide cross-linking agent, and 0.5-4 parts by weight, preferably 0.5-2 parts by weight, of an amine-based vulcanizing agent can be used on the basis of 100 parts by weight of ternary type AEM. When only the amine-based vulcanizing agent is used, foams are liable to generate and adhesion to the mold will be considerable. When only the peroxide-based cross-linking agent is used, on the other hand, foams are liable to generate in the case of ternary type AEM polymer alone, whereas in the case of plasticizer-added ternary type AEM/EPDM blend polymer foaming can be considerably suppressed, but the strength is lower than in the case of using both cross-linking agent and vulcanizing agent together. Thus, the single use of cross-linking agent or vulcanizing agent is not preferable. A proportion of more than 4 parts by weight each is not preferable also because of generation of foams.

Organic peroxide to be used as a peroxide-based cross-linking agent include, for example, t-butyl peroxide, dicumyl peroxide, 2,5-dimethyl-2,5-di(t-butylperoxy)hexane, 2,5-dimethyl-2,5-di(t-butylperoxy)hexine-3, 1,1-di(t-butylperoxy)-3,3,5-trimethylcyclohexane, etc.

Preferably used are 2,5-dimethyl-2,5-di(t-butylperoxy) hexane and 1,1-di(t-butylperoxy)-3,3,5-trimethylcyclohexane.

Amine-based vulcanizing agent to be used herein includes, for example, aliphatic polyamine compounds such as hexamethylenediamine, hexamethylenediamine carbamate, hexamethylene-cinnamaldehyde adduct, hexamethylenediamine benzoate, diamine-modified siloxane, etc.; alicyclic polyamine compounds such as 4,4'-methylenebiscyclohexylamine, bis(4-amino-3-methyldicyclohexyl)methane, 4,4'-methylenebiscyclohexylamine-cinnamaldehyde adduct, etc.; and aromatic polyamine compounds such as 4,4'-methylenedianiline, m-phenylenediamine, 4,4'-diaminodiphenyl ether, p-phenylenediamine, p,p'-ethylenedianiline, 4,4'-(p-phenylenediisopropylidene)dianiline, 4,4'-(m-phenylenediisopropylidene)dianiline, 3,4'-diaminodiphenyl ether, 4,4'-diaminodiphenylsulfone, 2,2-bis[4-(4-aminophenoxy)phenyl]propane, bis[4-(4-aminophenoxy)phenyl]sulfone, bis[4-(3-aminophenoxy)penyl]sulfone, 4,4'-bis(4-aminophenoxy) biphenol, bis[4-(4-aminophenoxy)phenyl]ether, 2,2-bis[4-(4-aminophenoxy)phenyl]hexafluoropropane, 1,4-bis(4-aminophenoxy)benzene, 1,3-bis(4-aminophenoxy)benzene, etc.

When an organic peroxide is used as a cross-linking agent, it is preferable to use a cocross-linking agent consisting of a polyfunctional unsaturated compound at the same time. The polyfunctional unsaturated compound includes, for example, ethylene glycol di(meth)acrylate, propylene glycol di(meth) acrylate, trialkyl isocyanurate, trialkyl cyanurate, trimethylolpropane tri(meth)acrylate, trialkyl trimellitate, etc. The cocross-linking agent consisting of a polyfunctional unsaturated compound can be used in a proportion of about 0.1 to about 10 parts by weight, preferably about 0.5 to about 5 parts by weight, on the basis of 100 parts by weight of the ternary type AEM. A proportion of less than about 0.1 part by weight will make the vulcanization rate and the physical properties of vulcanization products unsatisfactory, whereas a proportion of more than about 10 parts by weight will considerably lower the elongation value.

In addition to the foregoing vulcanizing agents, a vulcanizing agent of sulfur-based compound can be preferably used in a proportion of 0.1-0.5 parts by weight, preferably 0.1-0.3 parts by weight, on the basis of 100 parts by weight of the ternary type AEM. The sulfur compound includes sulfur, or a sulfur providing compound, for example, precipitated sulfur, morpholine-based accelerator, thiuram-based accelerator, thiazole-based accelerator, etc. Simultaneous use of the sulfur-based compound together with the peroxide-based cross-linking agent and the amine-based vulcanizing agent can improve the durability, more specifically crack growth resistance. A proportion of more than 0.5 parts by weight of the sulfur-based compound is not preferable, because of considerable deterioration of compression set value.

The copolymer rubber composition comprising the aforementioned essential components can attain the desired object, that is lower hardness and improvement of low temperature characteristics of vulcanization molding products made from the AEM material without occurrence of inconveniences such as air inclusion, etc., but improvement of processability, more specifically in non-adhesiveness of the products themselves to a mold, or prevention of bleeding occurrence, is still required.

Such improvement of processability can be attained by further adding α-olefin oligomer to the copolymer rubber composition. The α-olefin oligomer can be used in a proportion of about 1 to about 30 parts by weight, preferably about 2 to about 15 parts by weight, on the basis of 100 parts by weight of the ethylene-alkyl acrylate copolymer rubber. A proportion of less than about 1 part by weight cannot attain the improve-ment of processability, particularly improvement of mold releasability, whereas a proportion of more than about 30 parts by weight will deteriorate the roll kneadability.

In the case of addition of α-olefin oligomer, a bleeding problem is likely to be brought about in the absence of EPDM, and thus EPDM must be used at the same time in a proportion of about 5 to about 50 parts by weight on the basis of 100 parts by weight of the ethylene-alkyl acrylate copolymer rubber.

The α-olefin oligomer is a polymer of α-olefin represented by the following general formula:

$$CH_2=CHR$$

, where R is an alkyl group having 3-12 carbon atoms, and at least one of α-olefin oligomers having a number average molecular weight Mn of 300-1,400, preferably 400-1,000, can be used. The alkyl group having 3-12 carbon atoms, preferably 6-10 carbon atoms, more preferably 8 carbon atoms, can be used for the polymer side chain. Particular preference for 8 carbon atoms is due to a high viscosity index (index of viscosity dependency on temperatures) and also due to a low pour point, that is, good low temperature characteristics. Heat resistance and volatility are dependent largely on Mn. Thus, if Mn is the same, more carbon atoms of the side chain gives better balance between the heat resistance and the low temperature characteristics. Mn of less than 300 gives rise to volatization at the time of cross-linking or heat aging, resulting in a large decrease in the physical properties, whereas Mn of more than 1,400 has no more significant effect on the improvement of low temperature characteristics.

The copolymer rubber composition can be further mixed, if required, with carbon black or a white filler such as white carbon (silica), etc. as a reinforcing agent, a processing aid such as liquid polybutadiene, etc., an antioxidant, etc.

The composition can be prepared by a well known kneading means such as rolls, a kneader, etc., and vulcanization molding thereof can be carried out by press cross-linking at about 160° to about 190° C. for about 5 to about 15 minutes, and if required, by oven vulcanization (secondary vulcanization) at about 150° to about 230° C. for about 1 to about 15 hours.

EXAMPLES

The present invention will be described in detail below, referring to Examples.

Example 1

| | Parts by weight |
|---|---|
| Ternary type AEM (Vamac HVG, a DuPont product) | 100 |
| HAF carbon black (Shoblack N330L, Showa Cabot product) | 45 |
| Stearic acid | 2 |
| 4,4'-(α,α-dimethylbenzyl) diphenylamine (Antioxidant CD, Ouchi-Shinko Kagaku product) | 2 |
| Ether type, phosphate ester-based processing aid (RL210, a Toho Kagaku product) | 1 |

-continued

| | Parts by weight |
|---|---|
| Ether ester-based plasticizer for rubber (RS735, Asahi Denka product) | 25 |
| Liquid polybutadiene (Nisso B3000, Nihon Soda product) | 4 |
| Triallyl isocyanurate (Taic, Nihon Kasei product) | 2 |
| 1,3-bis(t-butylperoxyisopropyl) benzene (Peroxymon F40, NOF Corp. product: purity 40%) | 6 (Actual weight: 2.4) |
| Hexamethylenediamine carbamate (Cheminox AC-6, Unimatec product) | 2 |
| Diphenylguanidine (Accelerator D, Ouchi-Shinko Kagaku product) | 4 |

The foregoing components were kneaded by a kneader, and then subjected to press cross-linking at 180° C. for about 8 minutes and oven vulcanization (secondary cross-linking) at 200° C. for one hour, and the resulting vulcanization product was subjected to determination of the following material characteristics.

ODR: according to JIS K-6300, using a Lotus rheometer RIR3, Toyo Seiki product

Foaming state: Sheets, 230 mm×230 mm, 2 mm in thickness, were molded as test pieces. Absence of any foam on the sheet surface was evaluated as ○; 1-5 foams as Δ (less foaming), 5 or more foams, but not distributed throughout the entire sheet as ×, and 5 or more foams distributed throughout the entire sheet as ××

In evaluation by a compression ball, large-diameter test pieces, 29.0 mm in diameter and 12.5 mm in thickness according to JIS K6262 were vulcanization molded, and cut into halves. 4 half-cut test pieces were evaluated by counting number of test pieces having even one foam throughout the cross-section Furthermore, absence of adhesion of mold flashes of test pieces to the mold was evaluated as ○, presence of some mold flash adhesion as Δ, and presence of adhesion of considerable mold flash adhesion as ×

Normal state values: Hardness (Hs), 100% modulus (M100), tensile strength (Tb), and elongation (Eb) were determined according to JIS K-6253 and 6251

Comparative Example 1

In Example 1, neither hexamethylenediamine carbamate nor diphenylguanidine was used.

Comparative Example 2

In Example 1, neither triallyl isocyanurate nor 1,3-bis(t-butylperoxyisopropyl)benzene was used.

Comparative Example 3

In Example 1, the same amount of binary type AEM (Vamac DP, DuPont product) was used in place of the ternary type AEM.

Comparative Example 4

In Comparative Example 3, neither hexamethylenediamine carbamate nor diphenyl guanidine was used.

Comparative Example 5

In Comparative Example 3, neither trialkyl isocyanurate nor 1,3-bis(t-butylperoxyisopropyl)benzene was used.

Results obtained in the foregoing Example 1 and Comparative Examples 1 to 4 are given in the following Table 1. No vulcanization was attained in Comparative Example 5.

TABLE 1

| Determination · Evaluation Items | Ex. 1 | Comp. Ex. 1 | Comp. Ex. 2 | Comp. Ex. 3 | Comp. Ex. 4 |
|---|---|---|---|---|---|
| ODR(determination temp. 180° C.) | | | | | |
| MH(N · m) | 0.85 | 0.42 | 0.55 | 0.20 | 0.38 |
| ML(N · m) | 0.02 | 0.02 | 0.02 | 0.02 | 0.02 |
| T10(min.) | 1.01 | 1.19 | 0.97 | 1.16 | 1.28 |
| T50(min.) | 2.28 | 2.71 | 2.55 | 2.94 | 2.98 |
| T90(min.) | 5.64 | 6.00 | 10.75 | 6.88 | 6.70 |
| Foaming state | | | | | |
| 2 mmTP foaming state | ○ | ○ | ○ | X | X |
| Compression ball foaming state | 0 | 4 | 0 | 4 | 4 |
| Mold flash adhesion to mold | ○ | Δ | Δ | X | X |
| Normal state values | | | | | |
| Hs(Duro A) | 61 | 57 | 56 | 55 | 55 |
| M100(MPa) | 3.7 | 2.0 | 2.2 | 1.3 | 1.7 |
| Tb(MPa) | 16.1 | 9.8 | 16.9 | 5.7 | 5.7 |
| Eb(%) | 225 | 315 | 370 | 300 | 220 |

It can be concluded from the foregoing results that:

(1) in the case of using only the peroxide cross-linking system, foaming is observable (Comparative Example 1).

(2) in the case of using the binary type AEM, foaming is observable (Comparative Example 3).

Example 2

In Example 1, no ether ester-based plasticizer for rubber was used, and 50 parts by weight of oil extended type EPDM (Keltan 509×100, Idemitsu DSM product; 100 parts by weight of oil extender component is mixed on the basis of 100 parts by weight of polymer component) was further used.

Comparative Example 6

In Example 2, neither hexamethylenediamine carbamate nor diphenylguanidine was used.

Comparative Example 7

In Example 2, neither trialkyl isocyanurate nor 1,3-bis(t-butylperoxyisopropyl)benzene was used.

Comparative Example 8

In Example 2, the same amount of binary type AEM (Vamac DP) was used in place of the ternary type AEM.

Example 3

In Example 1, 25 parts by weight of EPDM (Mitsui 4070, Mitsui Chemical product) was further used.

Comparative Example 9

In Example 3, neither hexamethylenediamine carbamate nor diphenylguanidine was used.

Comparative Example 10

In Example 3, neither trialkyl isocyanurate nor 1,3-bis(t-butylperoxyisopropyl)benzene was used.

Comparative Example 11

In Example 3, the same amount of binary type AEM (Vamac DP) was used in place of the ternary type AEM.

Results obtained in the foregoing Examples 2 and 3 and Comparative Examples 6 to 11 are given in the following Table 2.

TABLE 2

| Determination · Evaluation Items | Ex. 2 | Comp. Ex. 6 | Comp. Ex. 7 | Comp. Ex. 8 | Ex. 3 | Comp. Ex. 9 | Comp Ex. 10 | Comp. Ex. 11 |
|---|---|---|---|---|---|---|---|---|
| ODR(determination temp. 180° C.) | | | | | | | | |
| MH(N · m) | 0.85 | 0.58 | 0.28 | 0.36 | 0.76 | 0.40 | 0.46 | 0.26 |
| ML(N · m) | 0.07 | 0.07 | 0.08 | 0.06 | 0.03 | 0.04 | 0.03 | 0.03 |
| T10(min.) | 0.86 | 1.04 | 0.74 | 0.94 | 0.96 | 1.11 | 0.88 | 0.97 |
| T50(min.) | 2.28 | 3.18 | 1.76 | 3.15 | 2.20 | 2.70 | 2.41 | 2.88 |
| T90(min.) | 7.26 | 7.69 | 6.63 | 7.79 | 4.93 | 5.74 | 9.80 | 6.86 |
| Foaming state | | | | | | | | |
| 2 mmTP foaming state | ○ | ○ | XX | ○ | ○ | ○ | X | ○ |
| Compression ball foaming state | 0 | 0 | 4 | 4 | 0 | 0 | 4 | 4 |
| Mold flash adhesion to mold | ○ | ○ | X | Δ | ○ | ○ | X | Δ |
| Normal state values | | | | | | | | |
| Hs(Duro A) | 55 | 50 | (impossible-to determine) | 50 | 60 | 55 | 55 | 55 |
| M100(MPa) | 2.9 | 1.4 | | 1.2 | 3.0 | 1.7 | 1.8 | 1.5 |
| Tb(MPa) | 12.5 | 9.9 | | 13.6 | 14.1 | 9.5 | 10.2 | 6.5 |
| Eb(%) | 240 | 435 | | 575 | 255 | 375 | 320 | 385 |

It can be concluded from the foregoing results that:

(3) in the case of blend rubber, where (oil extended) EPDM is added to the ternary type AEM, air inclusion is observable only with the amine vulcanization system (Comparative Examples 7 and 10), and no considerable air inclusion is observable only with the peroxide cross-linking system, but the strength is poor (Comparative Examples 6 and 9).

(4) in the case of using binary type AEM, foaming is observable as in Comparative Example 3 (Comparative Examples 8 and 11).

Example 4

In Example 1, 50 parts by weight of EPDM (Mitsui 4070) was further used.

Comparative Example 12

In Example 1, 75 parts by weight of EPDM (Mitsui 4070) was further used.

Comparative Example 13

In Example 1, 100 parts by weight of EPDM (Mitsui 4070) was further used.

Example 5

In Example 3, no ether ester-based plasticizer for rubber (RS735) was used.

Example 6

In Example 3, the amount of ether ester-based plasticizer for rubber (RS735) was changed to 10 parts by weight.

Example 7

In Example 3, the amount of ether ester-based plasticizer for rubber (RS735) was changed to 40 parts by weight.

Results obtained in the foregoing Examples 4 to 7 and Comparative Examples 12 and 13 are given in the following Table 3.

Relations of the amount of added EPDM to the low temperature shocking brittleness temperature were investigated. The low temperature shocking brittleness test was carried out according to JIS K-6261, and the results are given the following Table 4.

TABLE 4

|  | Ex. 1 | Ex. 3 | Ex. 4 | Comp. Ex. 12 | Comp. Ex. 13 |
| --- | --- | --- | --- | --- | --- |
| Amount of added EPDM (parts by weight) | 0 | 25 | 50 | 75 | 100 |
| Low temperature shocking brittleness temp. (° C.) | −30 | −46 | −50 | −53 | −56 |

It can be concluded from the foregoing results that:

(5) with increasing amount of added EPDM the low temperature shocking brittleness temperature is lowered, and when the amount of added EPDM exceeds 50 parts by weight the vulcanization rate is retarded to a high degree (Comparative Examples 12 and 13).

(6) when the amount of plastisizer is 40 parts by weight the mold flash adhesion to the mold is observable (Example 7).

Example 8

In Example 3, the amount of hexamethylenediamine carbamate (Cheminox AC-6) was changed to 0.5 parts by weight.

Example 9

In Example 3, the amount of hexamethylenediamine carbamate (Cheminox AC-6) was changed to 4 parts by weight.

Example 10

In Example 3, the amount of 1,3-bis(t-butylperoxyisopropyl)benzene (Peroxymon F40) was changed to 1.3 parts by weight (actual weight: 0.5 parts by weight).

TABLE 3

| Determination · Evaluation Items | Ex. 4 | Comp. Ex. 12 | Comp. Ex. 13 | Ex. 5 | Ex. 6 | Ex. 7 |
| --- | --- | --- | --- | --- | --- | --- |
| ODR(determination temp. 180° C.) | | | | | | |
| MH(N · m) | 0.72 | 0.65 | 0.44 | 1.06 | 0.81 | 0.53 |
| ML(N · m) | 0.05 | 0.03 | 0.02 | 0.06 | 0.05 | 0.02 |
| T10(min.) | 1.11 | 1.20 | 1.31 | 0.91 | 0.88 | 1.17 |
| T50(min.) | 2.72 | 3.09 | 3.58 | 2.27 | 2.15 | 3.10 |
| T90(min.) | 7.51 | 9.21 | 11.1 | 5.78 | 5.66 | 10.14 |
| Foaming state | | | | | | |
| 2 mmTP foaming state | ○ | ○ | ○ | ○ | ○ | ○ |
| Compression ball foaming state | 0 | 0 | 0 | 0 | 0 | 0 |
| Mole flash adhesion to mold | ○ | ○ | ○ | ○ | ○ | Δ |
| Normal state values | | | | | | |
| Hs(Duro A) | 63 | 63 | 60 | 72 | 66 | 50 |
| M100(MPa) | 3.8 | 2.9 | 2.9 | 6.1 | 4.5 | 1.8 |
| Tb(MPa) | 12.1 | 13.2 | 11.5 | 20.7 | 16.6 | 9.8 |
| Eb(%) | 200 | 270 | 275 | 235 | 250 | 320 |

Example 11

In Example 3, the amount of 1,3-bis(t-butylperoxyisopropyl)benzene (Peroxymon F40) was changed to 10 parts by weight (actual weight: 4.0 parts by weight).

Comparative Example 14

In Example 3, the amount of 1,3-bis(t-butylperoxyisopropyl)benzene (Peroxymon F40) was changed to 15 parts by weight (actual weight: 6.0 parts by weight).

Results obtained in the foregoing Examples 8 to 11, and Comparative Example 14 are given in the following Table 5.

TABLE 5

| Determination · Evaluation Items | Ex. 8 | Ex. 9 | EX. 10 | Ex. 11 | Comp. Ex. 14 |
|---|---|---|---|---|---|
| ODR(determination temp. 180° C.) | | | | | |
| MH(N · m) | 0.59 | 0.51 | 0.56 | 0.62 | 0.64 |
| ML(N · m) | 0.02 | 0.01 | 0.02 | 0.01 | 0.02 |
| T10(min.) | 1.45 | 1.32 | 1.21 | 1.17 | 0.92 |
| T50(min.) | 3.82 | 2.97 | 2.77 | 2.49 | 1.86 |
| T90(min.) | 10.87 | 10.0 | 7.76 | 6.41 | 4.49 |
| Foaming state | | | | | |
| 2 mmTP foaming state | ○ | ○ | ○ | ○ | Δ |
| Compression ball foaming state | 0 | 0 | 0 | 2 | 4 |
| Mold flash adhesion to mold | ○ | ○ | ○ | ○ | ○ |
| Normal state values | | | | | |
| Hs(Duro A) | 64 | 68 | 64 | 66 | 68 |
| M100(MPa) | 3.5 | 4.6 | 3.5 | 4.9 | 6.7 |
| Tb(MPa) | 12.3 | 13.4 | 12.5 | 12.4 | 11.6 |
| Eb(%) | 200 | 80 | 220 | 180 | 135 |

It can be concluded form the foregoing results that:

(7) in the case of using 4 parts by weight or more each of the amine-based vulcanizing agent and peroxide-based cross-linking agent, air inclusion is observable (Examples 9 and 11, and Comparative Example 14).

Example 12

| | Parts by weight |
|---|---|
| Ternary type AEM (Vamac HVG) | 100 |
| EPDM (Mitsui 4070) | 20 |
| HAF carbon black (Shoblack N330L) | 50 |
| Stearic acid | 2 |
| 4,4'-(α,α-dimethylbenzyl) diphenylamine (Antioxidant CD) | 2 |
| Ether type phosphate ester-based processing aid (RL210) | 1 |
| Ether ester-based plasticizer for rubber (Adekasizer RS735) | 15 |
| Liquid polybutadiene (Nisso B3000) | 4 |
| Triallyl isocyanurate (Taic) | 2 |
| 1,3-bis(t-butylperoxyisopropyl) benzene (Peroxymon F40) | 6 (actual weight: 2.4) |
| Hexamethylenediamine carbamate (Cheminox AC-6) | 2 |
| Diphenylguanidine (Accelerator D) | 4 |
| Precipitated sulfur (Karuizawa Seiren product) | 0.1 |

The foregoing components were kneaded by a kneader, and then subjected to press cross-linking at 180° C for 8 minutes and over vulcanization (secondary cross-linking) at 200°C for one hour, and the resulting vulcanization product was subjected to determination of the material characteristics.

Example 13

In Example 12, the amount of precipitated sulfur was changed to 0.25 parts by weight.

Example 14

In Example 12, the amount of precipitated sulfur was changed to 0.5 parts by weight.

Example 15

In Example 12, 0.25 parts by weight of a morpholine-based accelerator (Vulnoc R, Ouchi-Shinko Kagaku product) was used in place of the precipitated sulfur.

Example 16

In Example 12, 0.35 parts by weight of a thiuram-based accelerator (TRA, Ouchi-Shinko Kagaku product) was used in place of the precipitated sulfur.

Example 17

In Example 12, no precipitated sulfur was used.

Comparative Example 15

In Example 12, any of the precipitated sulfur, hexamethylenediamine carbamate, and diphenylguanidine was not used.

Comparative Example 16

In Example 12, any of the precipitated sulfur, trialkyl isocyanurate, and 1,3-bis(t-butylperoxyisopropyl) benzene was not used. The amount of HAF carbon black was changed to 65 parts by weight, and the amount of the plasticizer was changed to 35 parts by weight.

Results obtained in the foregoing Examples 12 to 17, and Comparative Examples 15 and 16 are given in the following Table 6.

Air-heated ageing test (150° C. for 70 hours):

Changes in hardness (ΔHs) shows a value of pre-ageing hardness–post-ageing hardness Figures in parentheses of percent change in the tensile strength (ΔTb) and percent change in the elongation (ΔEb) refer to measurement values after the heated ageing test, respectively Compression set: according to JIS K-6262 (150° C. for 70 hours)

Durability: according to JIS K-6260, where crack length in a 2 mm-notched test piece after 3,000 bendings was measured

TABLE 6

| Determination · Evaluation Items | Ex. 12 | Ex. 13 | Ex. 14 | Ex. 15 | Ex. 16 | Ex. 17 | Comp. Ex. 15 | Comp. Ex. 16 |
|---|---|---|---|---|---|---|---|---|
| ODR(determination temp. 180° C.) | | | | | | | | |
| MH(N · m) | 0.59 | 0.54 | 0.52 | 0.70 | 0.66 | 0.67 | 0.76 | 0.67 |
| T10(min.) | 1.02 | 0.85 | 0.76 | 1.18 | 1.14 | 0.88 | 0.85 | 0.86 |
| T50(min.) | 3.07 | 2.20 | 1.87 | 2.98 | 2.96 | 2.36 | 2.01 | 2.33 |
| T90(min.) | 8.69 | 7.89 | 6.92 | 6.07 | 6.35 | 7.70 | 4.61 | 9.74 |
| Normal state values | | | | | | | | |
| Hs(Duro A) | 62 | 58 | 57 | 60 | 59 | 64 | 65 | 67 |
| M100(MPa) | 3.6 | 2.1 | 1.8 | 2.7 | 2.2 | 2.0 | 4.4 | 4.2 |
| Tb(MPa) | 14.5 | 13.3 | 12.8 | 12.1 | 12.3 | 12.5 | 14.5 | 17.2 |
| Eb(%) | 300 | 345 | 395 | 265 | 300 | 320 | 225 | 320 |
| Specific gravity | 1.132 | 1.127 | 1.133 | 1.119 | 1.118 | 1.103 | 1.133 | 1.204 |
| Air-heated ageing test | | | | | | | | |
| ΔHs(points) | +5/+12 | +4/+35 | +4/+63 | +3/+25 | +4/+25 | +4/+33 | +3/+6 | +2/+6 |
| ΔTb(%) | +5 (15.2) | +8 (14.4) | +10 (14.0) | +7 | +11 | +11 | +8 (15.6) | +9 (18.7) |
| ΔEb(%) | −8 (275) | −1 (340) | −1 (390) | −8 | +1 | ±0 | −2 (220) | −6 (300) |
| Compression set (%) | 29 | 37 | 50 | 32 | 30 | 30 | 21 | 32 |
| Foaming state | | | | | | | | |
| 2 mmTP foaming state | ○ | ○ | ○ | ○ | ○ | ○ | ○ | ○ |
| Compression ball foaming state | 0 | 0 | 0 | 0 | 0 | 0 | 0 | 0 |
| Mold flash adhesion to mold | ○ | ○ | ○ | ○ | ○ | ○ | ○ | ○ |
| Durability | | | | | | | | |
| Crack growth by 3,000 bendings (mm) | 13.8 | 7.2 | 5.4 | 10.1 | 8.2 | broken (by 1,000 bendings) | broken (by 200 bendings) | 18.2 |

It can be concluded from the foregoing results that:

(8) an effect on the improvement of crack growth resistance can be confirmed by adding 0.1 part by weight of sulfur (Examples 12 and 17), and durability can be improved by further increasing the amount of sulfur (Example 13), whereas in the case of adding 0.5 parts by weight thereof, the crack growth resistance can be more improved, but the compression set resistance characteristic as a characteristic property of the AEM material, is deteriorated, resulting in exceeding such a target value as not more than 45% (Example 14), and such an effect on the durability improvement are expectable with sulfur-containing thiuram-based accelerator or morpholine-based vulcanizing agent (Examples 15 and 16).

(9) in the case of a cross-linking system consisting only of peroxide the crack growth resistance is found to be particularly worse (Comparative Example 15), whereas a vulcanization system consisting only of amine, an improving tendency is observable, as compared with the peroxide cross-linking system, but such a target value as not more than 15 mm cannot be satisfied (Comparative Example 16).

Example 18

| | Parts by weight |
|---|---|
| Ternary type AEM(Vamac HVG) | 100 |
| HAF carbon black (Shoblack N330L) | 65 |
| Stearic acid | 2 |
| 4,4'-(α,α-dimethylbenzyl) diphenylamine (Antioxidant CD) | 2 |

-continued

| | Parts by weight |
|---|---|
| Ether type phosphate ester-based processing aid (RL210) | 1 |
| Ether ester-based plasticizer for rubber (RS735) | 25 |
| 1,3-bis(t-butylperoxyisopropyl) benzene (Peroxymon F40: purity 40%) | 6 (actual weight: 2.4) |
| Hexamethylenediamine carbamate (Cheminox AC-6) | 1.5 |
| Diphenylguanidine (Accelerator D) | 4 |

The foregoing components were kneaded by a kneader, and then subjected to press cross-linking at 180° C. for about 8 minutes and oven vulcanization (secondary cross-linking) at 200° C. for one hour, and the resulting vulcanization product was subjected to determination of the following material characteristics.

Normal state physical properties: according to JIS K6253 and 6251, where hardness (Hs), tensile strength (Tb), and elongation (Eb) were determined Solvent resistance: Percent volume change was determined after dipping in ASTM No. 1 oil or IRM903 (standard test oil) at 150° C. for 70 hours Processability: Absence of adhesion of test piece body to a mold was evaluated as ○, and occurrence thereof as ×, and absence of bleeding was evaluated as ○, and occurrence thereof as ×

Example 19

In Example 18, 2 parts by weight of α-olefin oligomer (Duracin 170, BP product; Mn690, octyl group as a side chain) was further used.

Example 20

In Example 18, 5 parts by weight of EPDM (Mitsui 4070) and 5 parts by weight of α-olefin oligomer (Duracin 170) were further used.

Example 21

In Example 18, 10 parts by weight of EPDM (Mitsui 4070) and 5 parts by weight of α-olefin oligomer (Duracin 170) were further used.

Example 22

In Example 18, 20 parts by weight of EPDM (Mitsui 4070) and 5 parts by weight of α-olefin oligomer (Duracin 170) were further used.

Example 23

In Example 18, 50 parts by weight of EPDM (Mitsui 4070) and 5 parts by weight of α-olefin oligomer (Duracin 170) were further used.

Example 24

In Example 19, 5 parts by weight of EPDM (Mitsui 4070) was further used.

Example 25

In Example 20, no α-olefin oligomer (Duracin 170) was further used.

Results obtained in the foregoing Examples 18 to 25 are given in the following Table 7.

TABLE 7

| Determination · Evaluation Items | Example | | | | | | | |
|---|---|---|---|---|---|---|---|---|
| | 18 | 19 | 20 | 21 | 22 | 23 | 24 | 25 |
| Normal state values | | | | | | | | |
| Hs(Duro A) | 62 | 60 | 61 | 61 | 62 | 63 | 61 | 62 |
| Tb(MPa) | 12.8 | 12.6 | 12.2 | 10.7 | 10.3 | 10.0 | 12.4 | 12.5 |
| Eb(%) | 280 | 295 | 285 | 240 | 230 | 200 | 285 | 270 |
| Solvent resistance | | | | | | | | |
| ASTM No. 1 oil | −10 | −12 | −2 | +3 | +8 | +25 | −3 | −4 |
| IRM903 | +40 | +40 | +45 | +55 | +65 | +130 | +44 | +45 |
| Processability | | | | | | | | |
| Adhesion to mold | X | ○ | ○ | ○ | ○ | ○ | ○ | X |
| Bleeding generation | ○ | X | ○ | ○ | ○ | ○ | ○ | ○ |

It can be concluded from the foregoing results that:

(10) without addition of α-olefin oligomer the mold releasability is poor and adhesion of test piece body to the mold is observable (Examples 18 and 25), but improvement thereof is observable by addition of α-olefin oligomer, and in the case of addition of α-olefin oligomer, a problem of easy bleeding is observable without using EPDM together (Example 19).

(11) with an increasing amount of EPDM together with α-olefin oligomer, the solvent resistance to the test oil will be lowered, resulting in deterioration of oil resistance characteristic as a characteristic property of AEM material (Example 23), which will be thus a problem in the joint boot application, but no problem in the dust cover application requiring no solvent resistance.

The invention claimed is:

1. An ethylene-alkyl acrylate copolymer rubber composition, which comprises 100 parts by weight of ethylene-alkyl acrylate copolymer rubber, copolymerized with an epoxy group or hydroxyl group-containing monomer, 5-60 parts by weight of EPDM, 5-40 parts by weight of a plasticizer, 0.5-4 parts by weight of an organic peroxide cross-linking agent, and 0.5-4 parts by weight of an amine-based vulcanizing agent.

2. An ethylene-alkyl acrylate copolymer rubber composition according to claim 1, wherein oil extending EPDM is used for the EPDM.

3. An ethylene-alkyl acrylate copolymer rubber composition according to claim 2, wherein oil extending EPDM is used for the EPDM and the plasticizer.

4. An ethylene-alkyl acrylate copolymer rubber composition according to claim 2, wherein the oil extending EPDM is an EPDM mixed with 50-120% by weight of an oil extender on the basis of EPDM.

5. An ethylene-alkyl acrylate copolymer rubber composition according to claim 1, wherein the EPDM is used in a proportion of 5-50 parts by weight.

6. An ethylene-alkyl acrylate copolymer rubber composition according to claim 1, wherein the EPDM is used in a proportion of 5-40 parts by weight.

7. An ethylene-alkyl acrylate copolymer rubber composition according to claim 1, wherein 0.1-0.5 parts by weight of a sulfur-based compound is further used.

8. An ethylene-alkyl acrylate copolymer rubber composition according to claim 5, wherein together with 5-50 parts by weight of EPDM, 1-30 parts by weight of α-olefin oligomer which is a polymer α-olefin, represented by the general formula:

$$CH_2=CHR$$

,where R is an alkyl group having 3-12 carbon atoms, with a number average molecular weight Mn of 300-1,400, is further used.

9. An ethylene-alkyl acrylate copolymer rubber composition according to claim 6, for use as a molding material for constant velocity joint boots.

10. An ethylene-alkyl acrylate copolymer rubber composition according to claim 1, for used as a molding material for dust covers or vibration-damping rubber.

11. A constant velocity joint boot, obtained by cross-linking an ethylene-alkyl acrylate copolymer rubber composition according to claim 9.

12. A dust cover or vibration-damping rubber, obtained by cross-linking an ethylene-alkyl acrylate copolymer rubber composition according to claim 10.

13. An ethylene-alkyl acrylate copolymer rubber composition according to claim 3, wherein the oil extending EPDM is an EPDM mixed with 50-120% by weight of an oil extender on the basis of EPDM.

14. An ethylene-alkyl acrylate copolymer rubber composition according to claim 5, for used as a molding material for dust covers or vibration-damping rubber.

15. A dust cover or vibration-damping rubber, obtained by cross-linking an ethylene-alkyl acrylate copolymer rubber composition according to claim 14.

* * * * *

UNITED STATES PATENT AND TRADEMARK OFFICE
CERTIFICATE OF CORRECTION

PATENT NO.        : 7,435,778 B2                                          Page 1 of 1
APPLICATION NO.   : 10/594783
DATED             : October 14, 2008
INVENTOR(S)       : Shiro Hirose It is certified that error appears in the above-identified patent and that said Letters Patent is hereby corrected as shown below:

On the Title Page Item -73-

Assignee's name should be changed from:

Nok Corporation to

"NOK Corporation"

Signed and Sealed this

First Day of September, 2009

David J. Kappos
*Director of the United States Patent and Trademark Office*